L. H. REICHENBERGER.
HUB ATTACHMENT.
APPLICATION FILED FEB. 12, 1916.
1,251,920.
Patented Jan. 1, 1918.
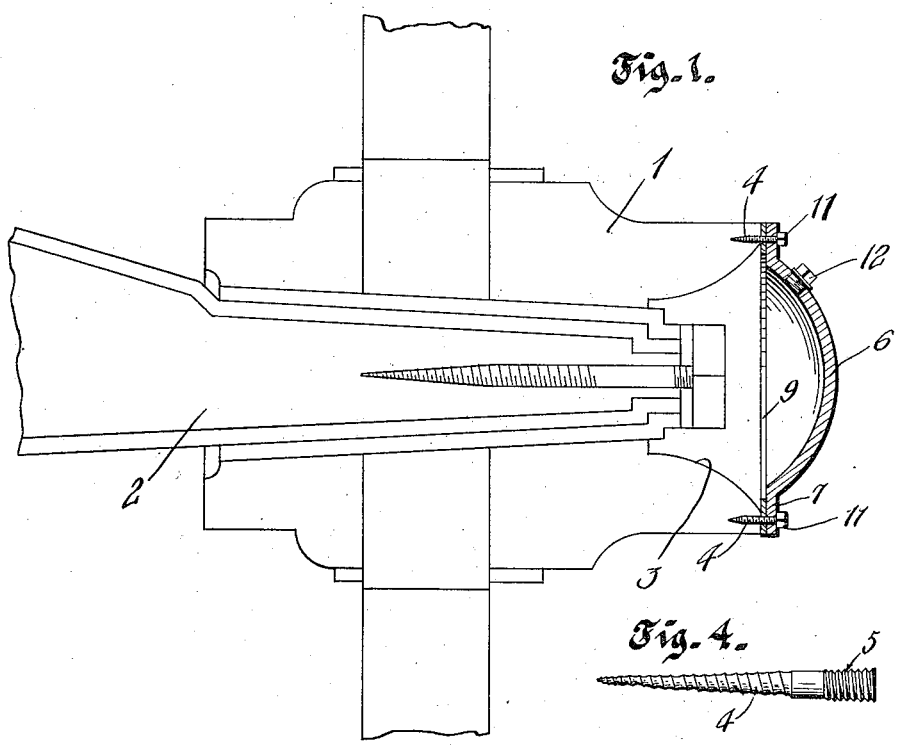
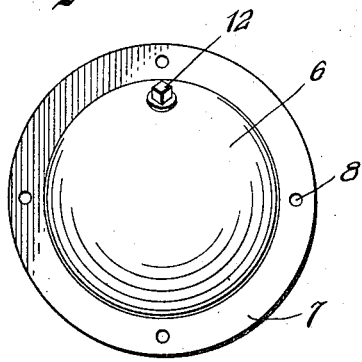
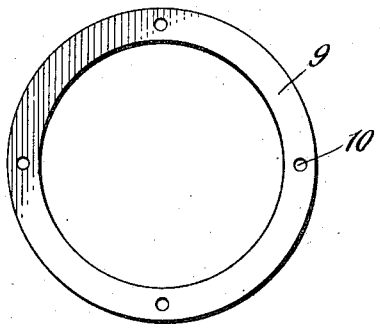
INVENTOR
Leo H. Reichenberger.
WITNESSES
BY
ATTORNEY

UNITED STATES PATENT OFFICE.

LEO H. REICHENBERGER, OF MOUNT HOPE, KANSAS.

HUB ATTACHMENT.

1,251,920.  Specification of Letters Patent.  Patented Jan. 1, 1918.

Application filed February 12, 1916. Serial No. 78,040.

*To all whom it may concern:*

Be it known that I, LEO H. REICHENBERGER, a citizen of the United States, residing at Mount Hope, in the county of Reno and State of Kansas, have invented certain new and useful Improvements in Hub Attachments, of which the following is a specification.

This invention relates to attachments for vehicle wheel hubs.

The principal object of the invention is to provide an attachment which will obviate the necessity of removing the wheel from its spindle when it is desired to grease the same, thus saving time and labor.

Another object of the invention is to provide an attachment of this character which will insure of a thorough lubrication of the spindle at all times.

A further object of the invention is to so construct the attachment and to so apply the same to the hub as to exclude foreign matter from the spindle, thereby providing for its longevity and efficiency in use.

A further object of the invention is to provide novel and efficient means for securing the attachment to a hub.

A still further object of the invention is to provide an attachment of this character which is extremely simple in construction, cheap and easy to manufacture, and which may be applied to a hub in a minimum of time and with slight labor.

With the foregoing and other objects in view, the invention consists in the novel features of construction, combination, and arrangement of parts, as will herein after be more fully described, illustrated in the accompanying drawings and claimed.

In the drawings:—

Figure 1 is a sectional view of a hub with the attachment applied thereto.

Fig. 2 is an outer face view of the attachment.

Fig. 3 is a face view of the gasket.

Fig. 4 is a side elevation of one of the improved securing elements.

Referring to the drawings by numerals, wherein is illustrated the preferred embodiment of my invention, 1 designates a vehicle wheel hub which is of any usual construction and which is adapted to be mounted upon the usual spindle 2, the hub being provided at its outer end with a recessed portion 3 as is usual, to receive the nut ordinarily utilized for securing the hub upon the spindle.

The attachment is adapted to be secured to the outer end of the hub so as to inclose the recess 3 to provide a space for receiving a suitable lubricant. In applying the attachment to the hub a plurality of lag bolts 4 are provided which are screwed into the end of the hub adjacent its outer edges in spaced relation. The outer ends of these lag bolts are permitted to extend beyond the end face of the hub and are threaded, as at 5, for a purpose which will presently appear.

A cap 6 is formed from a circular blank of sheet metal and is pressed into substantially hemispherical shape, as is illustrated to advantage in Fig. 1 of the drawings. The material of this cap, adjacent its peripheral edge is flattened, as indicated at 7, so as to abut snugly against the outer end of the hub. This flattened portion 7 is provided with a plurality of spaced openings 8 to receive the projecting ends of the lag bolts 4. The cap is adapted to be placed against the outer face of the hub with the spherical portion thereof arranged outwardly so as to provide a relatively large space between the cap and the hub. Before the cap is mounted upon the hub, however, a gasket 9 having a plurality of spaced openings 10 therein is arranged upon the outer end of the hub with the lag bolts 4 extending through the openings 10, as will be understood. The cap is then applied to the hub, the lag bolts being extended through the openings 8 in the portion 7 and nuts 11 engaged with the threads 5 to secure the cap to the hub, tightening of the nuts serving to draw the cap into clamping relation with the gasket to provide a tight joint between the hub and the cap.

A threaded opening of any desired size is formed in the spherical portion of the cap at any desired point. This opening may be closed by a plug 12. By removing the plug light grease or oil may be inserted within the space or pocket formed by inclosing the outer end of the hub by the cap, and the plug then threaded into the opening to retain the grease or oil therein. As the hub rotates upon the spindle the grease or oil will work its way about the spindle and the bearing face of the hub so as to effectually lubricate the same. It will thus be seen that a thorough lubrication of the spindle will be provided at all times, it being merely necessary to remove plug 12 and occasionally refill the pocket between the hub and the cap.

By the provision of an attachment, as has just been described, to a vehicle wheel hub it will be noted that the necessity of removing the hub from the spindle in order to lubricate the same is obviated. It will also be noted that the cap serves to prevent any dust, grit or other foreign matter from contacting with the spindle thereby increasing its efficiency and durability. By the provision of the peculiar form of lag bolts the attachment may be applied to a hub in an efficient manner in slight time.

From the foregoing description taken in connection with the accompanying drawings it is thought that the construction and operation of the improved attachment will be clearly understood, and while I have herein shown and described one specific embodiment of my invention, I do not wish to be limited thereto, except for such limitations as the claim may import.

I claim:

The combination with a vehicle wheel hub of a cap for closing the end thereof to form an oil receptacle, said cap having a horizontal outwardly projecting flange at the open end provided with a plurality of spaced holes therein, of a plurality of studs each having a wood engaging screw formed on one end for holding the stud in the end of the hub and projecting a short distance therefrom to engage the holes in the flange of said cap, a metal engaging screw threaded on the projecting outer end of each of said studs, a nut screwed on each of said projecting ends for holding the cap on the hub, and a packing ring between the end of the hub and said flange.

In testimony whereof I affix my signature in presence of two witnesses.

LEO H. REICHENBERGER.

Witnesses:
C. F. FOUQUET,
G. MAY, Jr.

Copies of this patent may be obtained for five cents each, by addressing the "Commissioner of Patents, Washington, D. C."